E. C. SCRUGGS.
HOSE SUPPORTER.
APPLICATION FILED DEC. 28, 1908.
940,285.
Patented Nov. 16, 1909.
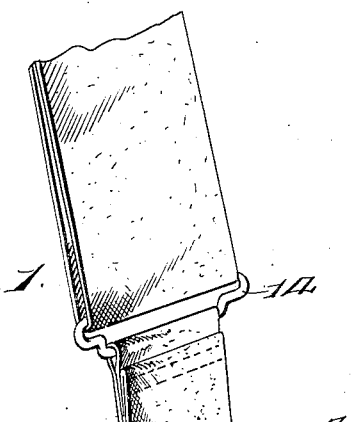
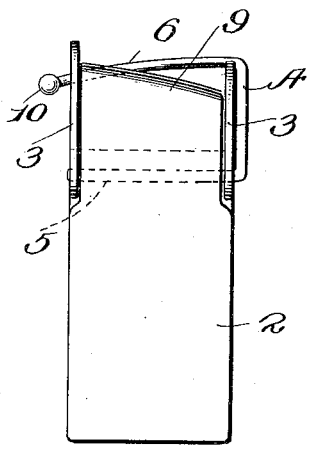
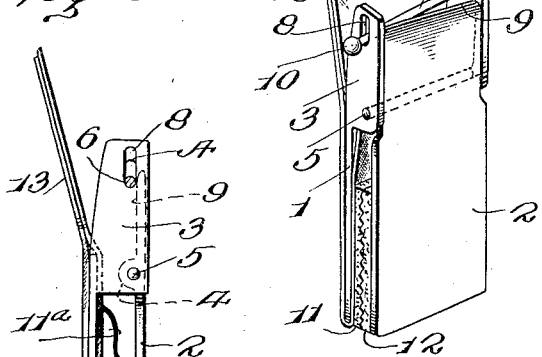
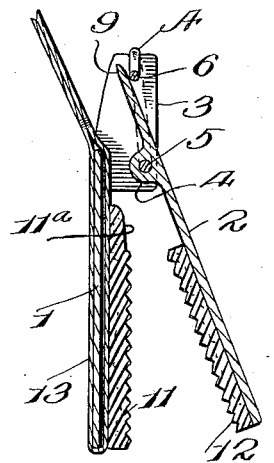
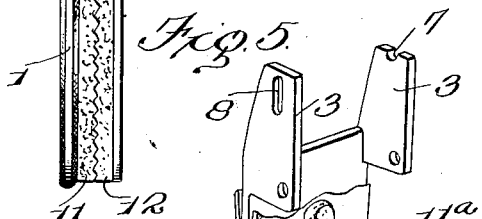
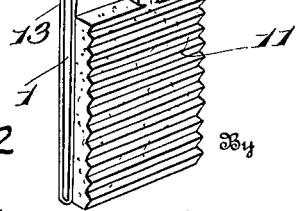
Inventor
E. C. Scruggs

UNITED STATES PATENT OFFICE.

EDWARD C. SCRUGGS, OF NASHVILLE, TENNESSEE.

HOSE-SUPPORTER.

940,285.  Specification of Letters Patent.  Patented Nov. 16, 1909.

Application filed December 28, 1908. Serial No. 469,520.

*To all whom it may concern:*

Be it known that I, EDWARD C. SCRUGGS, a citizen of the United States, residing at Nashville, in the county of Davidson and State of Tennessee, have invented certain new and useful Improvements in Hose-Supporters, of which the following is a specification.

This invention comprehends certain new and useful improvements in hose supporters and the invention has for its object, a simple, durable and efficient construction of hose supporter and relates more particularly to the clip for securing the stocking to the webbing of the suspension device. And the invention consists in certain constructions, arrangements and combinations of the parts that I shall hereinafter fully describe and claim.

For a full understanding of the invention, reference is to be had to the following description and accompanying drawings in which:

Figure 1 is a perspective view illustrating a portion of the hose supporter provided with the improved clip of my invention; Fig. 2 is a face view of the clip detached; Fig. 3 is a side edge view of the clip; Fig. 4 is a longitudinal sectional view thereof; and, Fig. 5 is a perspective view of one of the jaws.

Corresponding and like parts are referred to in the following description and indicated in all the views of the accompanying drawings by the same reference characters.

My invention comprises two jaws 1 and 2, the jaw 1 being formed at its upper end with longitudinally elongated ears 3 between the lower ends of which the head portion 4 of the jaw 2 fits, the said heat portion being thickened as shown to receive the pintle arm 5 of a U-shaped spring A, the said arm passing through the ears and said head portion 4 to pivotally connect said jaws together. The spring A also embodies a latch arm 6 which passes through a recess 7 in the upper end of one ear, and through a longitudinally extending slot 8 in the other ear, the said latch arm being designed to extend over and engage a beveled inclined tongue 9 formed on the member 2 above the head portion thereof. Preferably the projecting free end is formed with a ball 10 or the like so that it may be conveniently grasped in disengaging the latch arm from the tongue and permit the jaw 2 to swing outwardly from the other jaw so as to open the clip.

11 and 12 designate corrugated pads of rubber or the like that are secured in any desired way to the respective jaws 1 and 2, the corrugations of the pads preferably extending transversely and interlocking with each other in the closed position of the jaws. The pad 11 is preferably formed with an upwardly projecting middle extension 11ª designed to assist in holding the upper edge of the hose between the jaws in the closed position of the latter without the danger of tearing the material.

The webbing 13 to which the clip is secured is preferably passed entirely around the jaw 1 so as to cover the rear face thereof and prevent the metal from contact with the person, and the said webbing may be secured to the main portion of the supporter, which may be any desired construction and design, by means of a loop 14 which may also be of any desired construction or design.

From the foregoing description, in connection with the accompanying drawing, it will be seen that I have provided a very cheap, simple and durable and efficient construction of clip particularly designed for use in connection with a hose supporter, which may be easily manipulated to open and close the jaws. In order to open the device, it is only necessary to spring the latch outwardly so as to disengage the beveled tongue 9 whereupon the jaw 2 may be swung outwardly and the stocking released. In order to secure the clip in place, it is only necessary to place the upper edge of the stocking between the jaws 1 and 2 and to press the jaws together, whereupon the latch arm 6 will swing outwardly and snap over the tongue 9 to lock the jaws in closed position.

Having thus described the invention, what is claimed as new is—

1. A clip comprising jaws, one of said jaws being formed at one end with longitudinally extending ears, and a U-shaped spring, one arm of which extends through said ears and the other jaw to pivotally connect said jaws together, the ears being formed respectively with a recess and an opening through which the other arm of the spring extends, and in which said last named arm is mounted for a spring movement, the other jaw being formed with a tongue designed to be engaged by said arm.

2. A clip, comprising jaws one of which is formed with ears and the other of which is formed with a tongue designed to extend between said ears, a pintle arm passing through said ears and the said other jaw and pivotally connecting said jaws together, one of said ears being formed with a slot and a latch arm engaging said other ear and passing through said slot and designed to engage said tongue and hold the arms in closed position.

3. A clip, comprising jaws one of which is formed with ears, and the other of which is formed with a tongue designed to lie between said ears, and a U-shaped spring provided with a pintle arm extending through said ears and the said other jaw, and pivotally connecting said jaws together, the said ears being formed respectively with a recess and an opening through which the other arm of the spring extends into engagement with the tongue.

In testimony whereof I affix my signature in presence of two witnesses.

EDWARD C. X SCRUGGS. [L. S.]
his mark

Witnesses:
W. B. BALLARD,
J. W. VAUGHAN.